US009008934B2

(12) United States Patent
Fujii et al.

(10) Patent No.: US 9,008,934 B2
(45) Date of Patent: Apr. 14, 2015

(54) BRAKING-DRIVING FORCE CONTROL DEVICE OF VEHICLE (75) Inventors: Daigo Fujii, Susono (JP); Shingo Koumura, Yatomi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 13/814,630

(22) PCT Filed: Aug. 31, 2010

(86) PCT No.: PCT/JP2010/064834
§ 371 (c)(1),
(2), (4) Date: Feb. 6, 2013

(87) PCT Pub. No.: WO2012/029133
PCT Pub. Date: Mar. 8, 2012

(65) Prior Publication Data
US 2013/0151104 A1    Jun. 13, 2013

(51) Int. Cl.
*B60W 10/192* (2012.01)
*B60W 10/08* (2006.01)
*B60W 30/02* (2012.01)
*B60L 15/20* (2006.01)
*B60T 1/10* (2006.01)
*B60W 30/20* (2006.01)

(52) U.S. Cl.
CPC .......... *B60W 30/025* (2013.01); *B60L 15/2036* (2013.01); *B60L 2220/44* (2013.01); *B60L 2240/18* (2013.01); *B60L 2240/423* (2013.01); *B60L 2270/145* (2013.01); *B60T 2240/04* (2013.01); *B60T 2240/06* (2013.01); *Y02T 10/646* (2013.01); *B60W 10/08* (2013.01); *B60W 10/192* (2013.01); *B60T 1/10* (2013.01); *Y02T 10/648* (2013.01); *B60W 30/20* (2013.01)

(58) Field of Classification Search
USPC .......................................... 701/70
See application file for complete search history.

(56) References Cited

U.S. PATENT DOCUMENTS

2005/0274560 A1    12/2005  Wakao et al.

FOREIGN PATENT DOCUMENTS

| EP | 1 065 076 A1 | 1/2001 |
| JP | A-2001-105813 | 4/2001 |
| JP | A-2005-75189 | 3/2005 |
| JP | A-2007-118898 | 5/2007 |
| WO | WO 03/095261 A1 | 11/2003 |

*Primary Examiner* — John Q Nguyen
*Assistant Examiner* — Kyung Kim
(74) *Attorney, Agent, or Firm* — Oliff PLC (57) ABSTRACT When a vehicle travels, due to an input from a road surface to the front wheels and rear wheels of the vehicle, unsprung vertical accelerations are generated in unsprung portions of the vehicle. An electronic control unit detects such unsprung vertical accelerations. The electronic control unit calculates a front-back force generated at each of the wheels by use of the detected unsprung vertical acceleration, and estimates a front-back vibration generated in each of the wheels. The electronic control unit calculates a front-back vibration suppressing force for absorbing the front-back vibration by use of the detected unsprung vertical acceleration. The electronic control unit subtracts the calculated front-back vibration suppressing force from the calculated front-back force, and operates the in-wheel motors via an inverter, while controlling the output torques of the in-wheel motors. Thus, the front-back vibrations of the unsprung portions of the vehicle can be suppressed.

6 Claims, 9 Drawing Sheets

BRAKING-DRIVING FORCE CONTROL DEVICE OF VEHICLE

TECHNICAL FIELD

The present invention relates to a braking-driving force control device of a vehicle which individually controls driving forces or braking forces to be generated at respective wheels of the vehicle.

BACKGROUND ART

Recently, there has been developed, as a form of an electric vehicle, a vehicle of a so-called in-wheel motor type which has electric motors inside or near the corresponding wheels (unsprung portions) of the vehicle and which drives the wheels directly by means of the electric motors. In such a vehicle of an in-wheel motor type, rotations of the electric motors provided for the corresponding wheels are controlled individually. Namely, by means of individually performing drive (power running) control or regenerative control for the motors, driving forces or braking forces to be applied to the respective wheels can be controlled individually in accordance with the traveling state of the vehicle.

Regarding such a vehicle of an in-wheel motor type, for example, Patent Document 1 listed below discloses a braking-driving force control device of a vehicle which applies different braking/driving forces to the respective wheels so as to suppress vibration of the vehicle in the vertical direction accompanying a pitching behavior of the vehicle which occurs when the vehicle is running over a stepped portion, etc. of a road surface, to thereby reduce a pitching moment generated around the vehicle's center of gravity.

Patent Document 2 listed below discloses an in-wheel motor system in which the diameter of a smallest-diameter portion of a wheel rim is rendered sufficiently large in relation to the outer diameter of a tire so as to enable a high-power motor to be installed in the wheel rim, and the vertical spring constant of the tire can be made far smaller than that of a tire which has the same size and an ordinary cross sectional shape so as to assure satisfactory riding quality in terms of vibration and sufficient resistance to shock caused by a large input.

PRIOR ART DOCUMENT

Patent Document

Patent Document 1: Japanese Patent Application Laid-Open (kokai) No. 2007-118898
Patent Document 2: Japanese Patent Application Laid-Open (kokai) No. 2005-75189

SUMMARY OF THE INVENTION

Incidentally, in general, if a tire constituting a wheel deforms due to an input from a road surface while a vehicle is traveling, a vibration (front-back vibration) in the front-back direction of the vehicle (hereinafter referred to as (vehicle front-back direction) is generated in the wheel. It is said that such front-back vibration is generated due to a force (front-back force) generated in the wheel in the vehicle front-back direction.

In a vehicle of an in-wheel motor type, the front-back force generated in each wheel tends to increase because the rotational moment of inertia of the wheel is large as compared with those in ordinary vehicles. As a result, a large front-back vibration is liable to be generated, and the riding quality of the vehicle may deteriorate.

The above-mentioned conventional braking-driving force control device for a vehicle can suppress a vibration of the vehicle in the vertical direction generated as a result of pitching of the vehicle, which occurs when the vehicle runs over a stepped portion or the like of a road surface; however, no consideration is given to suppression of the front-back force (i.e., the front-back vibration). Although the conventional in-wheel system can reduce the vertical spring constant of the tire, no consideration is given to suppression of the front-back force (i.e., the front-back vibration).

Accordingly, in the case of the vehicle of an in-wheel motor type, it is necessary to effectively suppress the front-back vibrations generated in the wheels in order to improve the riding quality of the vehicle.

The present invention has been conceived to solve the above-described problem, and an object of the prevent invention is to provide a braking-driving force control device of a vehicle which individually controls driving or braking forces generated at the wheels of the vehicle, to thereby reduce vibrations of unsprung portions (including the wheels) of the vehicle in the vehicle front-back direction.

To achieve the above-described object, the present invention provides a braking-driving force control device of a vehicle comprising a braking-driving force generation mechanism which individually generates an electromagnetic driving or braking force at each wheel of the vehicle and control means for controlling the braking-driving force generation mechanism in order to individually generate the electromagnetic driving or braking force at the wheel. The control means comprises unsprung vertical acceleration detection means for detecting the vertical acceleration of the unsprung portion (including the wheel) of the vehicle in the vehicle vertical direction; front-back vibration estimation means for estimating the front-back vibration generated in the unsprung portion of the vehicle in the vehicle front-back direction, on the basis of the vertical acceleration detected by the unsprung vertical acceleration detection means; front-back vibration suppressing force computation means for computing a front-back vibration suppressing force for absorbing the front-back vibration estimated by the front-back vibration estimation means; and braking-driving force generation mechanism operating means for operating the braking-driving force generation mechanism on the basis of the front-back vibration suppressing force computed by the front-back vibration suppressing force computation means.

In this case, preferably, the front-back vibration suppressing force computation means computes the front-back vibration suppressing force by use of the vertical acceleration detected by the unsprung vertical acceleration detection means. In this case, preferably, the control means includes wheel rotational speed detection means for detecting speed of the wheel in a rotational direction thereof, and the front-back vibration suppressing force computation means computes the front-back vibration suppressing force by use of the vertical acceleration detected by the unsprung vertical acceleration detection means and the speed of the wheel in the rotational direction which is detected by the wheel rotational speed detection means. In addition, in the above-described cases, preferably, the control means includes unsprung front-back acceleration detection means for detecting front-back acceleration of the unsprung portion of the vehicle in the vehicle front-back direction, and the front-back vibration suppressing force computation means computes the front-back vibration suppressing force by use of the front-back acceleration detected by the unsprung front-back acceleration detection means. In this case, preferably, the front-back vibration suppressing force computation means receives, through feedback, the detected front-back acceleration from the unsprung front-back acceleration detection means, and calculates the front-back vibration suppressing force by use of the received front-back acceleration.

In addition, in the above-described cases, preferably, the front-back vibration estimation means computes the front-back force generated in the unsprung portion of the vehicle in the vehicle front-back direction, on the basis of the vertical acceleration detected by the unsprung vertical acceleration detection means, and estimates the front-back vibration on the basis of the calculated front-back force. In this case, preferably, the braking-driving force generation mechanism operating means operates the braking-driving force generation mechanism by use of a value obtained by subtracting the front-back vibration suppressing force computed by the front-back vibration suppressing force computation means from the front-back force computed by the front-back vibration estimation means.

By virtue of the above-described configurations, the control means can detect the unsprung vertical acceleration of the unsprung portion of the vehicle which travels using, for example, the electromagnetic driving force generated by the braking-driving force generation mechanism, and estimate the front-back vibration generated in the unsprung portion of the vehicle on the basis of the detected unsprung vertical acceleration. Specifically, at this time, the control means can calculate the front-back force generated in the unsprung portion of the vehicle by use of the unsprung vertical acceleration, and estimate the front-back vibration on the basis of the calculated front-back force.

Subsequently, the control means can calculate the front-back vibration suppressing force for absorbing the estimated front-back vibration, and operate the braking-driving force generation mechanism on the basis of the calculated front-back vibration suppressing force. Specifically, in this case, the control means can calculate the front-back vibration suppressing force by use of at least one of the unsprung vertical acceleration, a combination of the unsprung vertical acceleration and the speed of the wheel in the rotational direction thereof, and the unsprung front-back acceleration. In addition, in the case where the control means calculates the front-back force, the control means can operate the braking-driving force generation mechanism by use of the value obtained by subtracting the front-back vibration suppressing force from the calculated front-back force, thereby generating an electromagnetic driving or braking force.

As mentioned above, the braking-driving force control device of the present invention can estimate the front-back vibration generated in the unsprung portion of the vehicle, calculate the front-back vibration suppressing force for absorbing the calculated front-back vibration, and operate the braking-driving force generation mechanism on the basis of the calculated front-back vibration suppressing force. Accordingly, even in the case of a vehicle in which each wheel has a large rotational moment of inertia (e.g., a vehicle of an in-wheel motor type), the braking-driving force control device of the present invention can effectively suppress the front-back vibration generated in the unsprung portion (including the wheels) of the vehicle, thereby improving the riding quality of the vehicle.

BEST MODE FOR CARRYING OUT THE INVENTION a. First Embodiment

Figure 1:
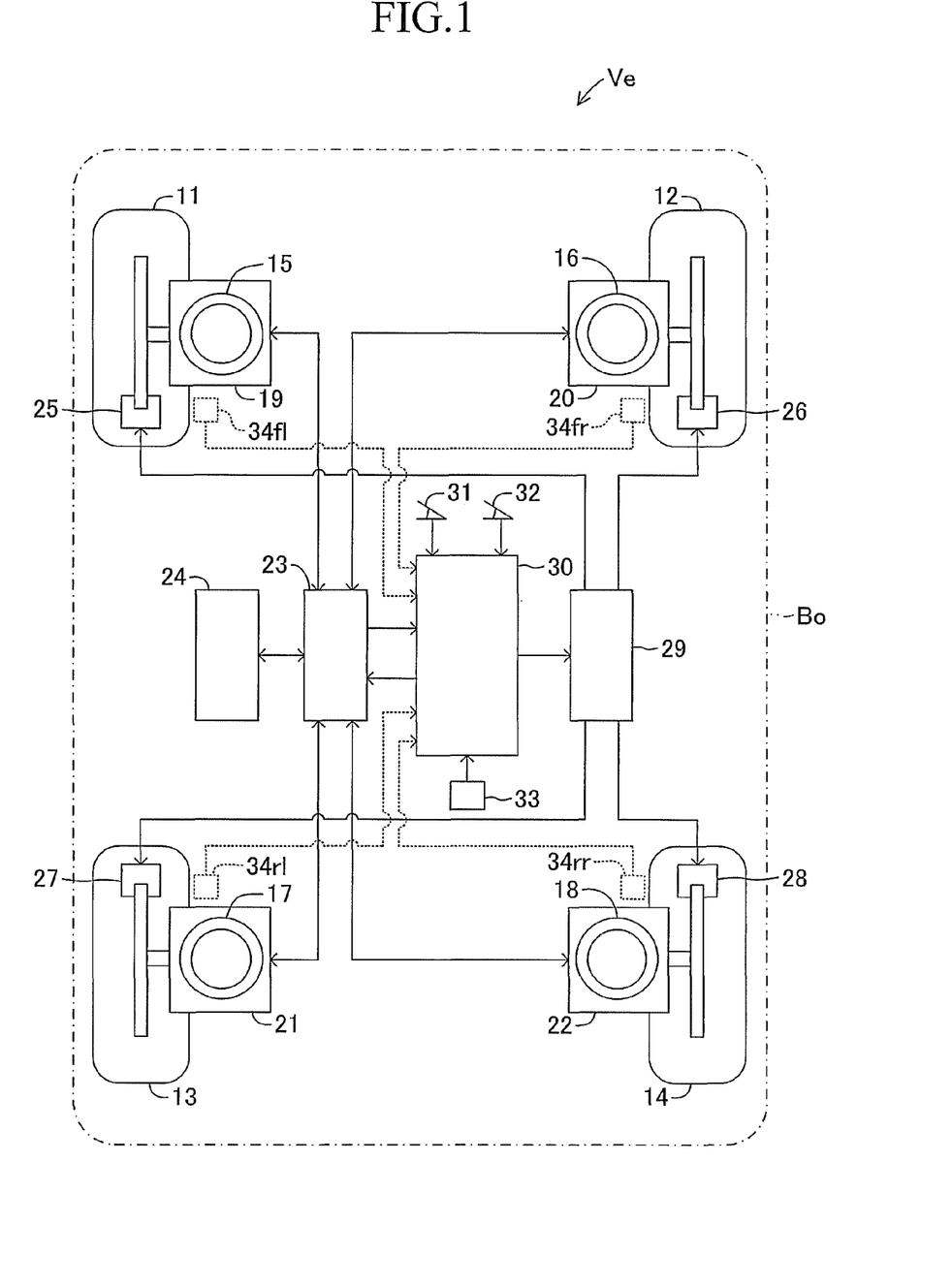
FIG. 1 is a schematic diagram schematically showing the configuration of a vehicle to which a braking-driving force control device of a vehicle common to all embodiments is applied.

Hereinafter, an embodiment of the present invention will be described with reference to the drawings. FIG. 1 is a schematic diagram showing the configuration of a vehicle Ve in which a braking-driving force control device of a vehicle common to all embodiments is installed.

The vehicle Ve includes left and right front wheels 11 and 12 and left and right rear wheels 13 and 14. The left and right front wheels 11 and 12 are supported by a body Bo of the vehicle Ve via suspension mechanisms 15 and 16 such that they can move together or independently. The left and right rear wheels 13 and 14 are supported by the body Bo of the vehicle Ve via suspension mechanisms 17 and 18 such that they can move together or independently.

Since the structures of the suspension mechanisms 15 to 18 are not related directly to the present invention, their detailed description will not be provided. For example, there can be employed commonly-known suspensions such as a strut-type suspension which includes a strut having an incorporated shock absorber, a coil spring, a suspension arm, etc.; and a wishbone-type suspension which includes a coil spring, a shock absorber, upper and lower suspension arms, etc.

Electric motors 19 and 20 are incorporated in the left and right front wheels 11 and 12, and electric motors 21 and 22 are incorporated in the left and right rear wheels 13 and 14. These motors are coupled to the left and right front wheels 11 and 12 and the left and right rear wheels 13 and 14 respectively such that they can transmit power to the corresponding wheels. Namely, the electric motors 19 to 22 are so-called in-wheel motors, and are disposed on the unsprung portions of the vehicle Ve along with the left and right front wheels 11 and 12 and the left and right rear wheels 13 and 14. By means of controlling rotations of the in-wheel motors 19 to 22 individually, driving forces and braking forces to be generated in the left and right front wheels 11 and 12 and the left and right rear wheels 13 and 14 can be controlled individually.

Each of the above-described in-wheel motors 19 to 22 is composed of, for example, an AC synchronous motor. Each of the in-wheel motors 19 to 22 is supplied, via an inverter 23, with AC power converted from DC power of an electricity storage device 24 such as a battery or a capacitor. Thus, under drive (power running) control, the in-wheel motors 19 to 22 apply electromagnetic driving forces to the left and right front wheels 11 and 12 and the left and right rear wheels 13 and 14.

In addition, under regenerative control, the in-wheel motors 19 to 22 can generate electric power through use of rotational energies of the left and right front wheels 11 and 12 and the left and right rear wheels 13 and 14. Specifically, when the in-wheel motors 19 to 22 generate electricity through regeneration, rotational (kinetic) energy of each of the left and right front wheels 11 and 12 and the left and right rear wheels 13 and 14 is converted to electrical energy by the corresponding one of the in-wheel motors 19 to 22, and the generated electric power (regenerated electric power) is stored in the electricity storage device 24 via the inverter 23. At this time, the in-wheel motors 19 to 22 apply to the corresponding left and right front wheels 11 and 12 and the left and right rear wheels 13 and 14 electromagnetic braking forces generated as a result of regenerative generation of electricity.

A braking mechanism 25 is provided between the wheel 11 and the in-wheel motor 19; a braking mechanism 26 is provided between the wheel 12 and the in-wheel motor 20; a braking mechanism 27 is provided between the wheel 13 and the in-wheel motor 21; and a braking mechanism 28 is provided between the wheel 14 and the in-wheel motor 22. Each of the braking mechanisms 25 to 28 is a commonly-known braking apparatus such as a disc brake or a drum brake. These braking mechanisms 25 to 28 are connected to a brake actuator 29 which operates brake caliper pistons (not shown) and brake shoes (not shown) generating braking forces in the respective wheels 11 to 14 through use of hydraulic pressure of oil supplied from an unillustrated master cylinder.

The above-described inverter 23 and the brake actuator 29 are connected to an electronic control unit 30 for controlling the rotation states of the in-wheel motors 19 to 22 and the operating states of the braking mechanisms 25 to 28. Therefore, the in-wheel motors 19 to 22, the inverter 23, and the electricity storage device 24 constitute the braking-driving force generation mechanism of the present invention, and the electronic control unit 30 constitutes the control means of the present invention.

The electronic control unit 30, which is mainly composed of a microcomputer including a CPU, a ROM, a RAM, etc., executes various programs so as to control operation of the in-wheel motors 19 to 22. For this purpose, signals from various sensors and a signal from the inverter 23 are input to the electronic control unit 26. The sensors include an accelerator sensor 31 that detects the amount of accelerator operation performed by the driver from the stepped-on amount (or the angle, pressure, etc.) of an accelerator pedal, a brake sensor 32 that detects the amount of brake operation performed by the driver from the stepped-on amount (or the angle, pressure, etc.) of a brake pedal, and a vehicle speed sensor 33 that detects the speed U of the vehicle Ve.

As mentioned above, the sensors 31 to 33 and the inverter 23 are connected to the electronic control unit 30, and the signals from the sensors 31 to 33 and the inverter 23 are input to the electronic control unit 30. Therefore, the electronic control unit 30 can grasp and control the traveling state of the vehicle Ve.

Specifically, the electronic control unit 30 can calculate a requested driving force and a requested braking force corresponding to the amount of accelerator operation by the driver and the amount of brake operation by the driver (i.e., a total driving force for driving or braking the vehicle Ve) on the basis of the signals received from the accelerator sensor 31 and the brake sensor 32. In addition, the electronic control unit 30 can calculate output torques (motor torques) of the in-wheel motors 19 to 22 on the basis of the signals received from the inverter 23 (e.g., signals representing the electric powers and currents supplied to the in-wheel motors 19 to 22 under drive control).

Thus, the electronic control unit 30 can output signals for controlling rotations of the in-wheel motors 19 to 22 via the inverter 23, and signals for controlling operations of the braking mechanisms 25 to 28 via the brake actuator 29. Accordingly, the electronic control unit 30 can control the traveling state of the vehicle Ve by calculating the total driving force required for the vehicle Ve on the basis of the signals received from the accelerator sensor 31 and the brake sensor 32, and outputting signals for controlling the driving/regeneration states of the in-wheel motors 19 to 22 and the operation of the brake actuator 29 (i.e., operations of the braking mechanisms 25 to 28) so as to generate the calculated total driving force, respectively.

Figure 2:
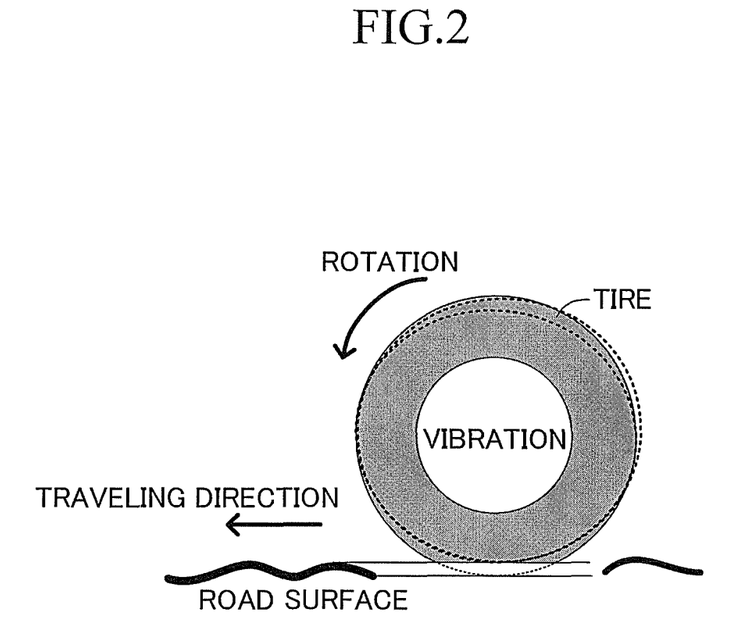
FIG. 2 is an illustration showing deformation of a tire which occurs due to an input from a road surface while the vehicle is traveling.

Incidentally, in general, when a vehicle travels, an input in the vehicle vertical direction which changes in accordance with the shape of the road surface is applied from the road surface to a rotating wheel and its suspension mechanism. In such a case, vibration in the vehicle front-back direction may be generated in the unsprung portion of the vehicle Ve, which may deteriorate the riding quality. That is, when the vehicle travels, as shown in FIG. 2, the tire constituting the rotating wheel deforms to match the shape of the road surface. When the tire deforms due to the input from the road surface, as indicated by the broken line in FIG. 2, the dynamic loaded radius of the tire changes in relation to the static loaded radius of the tire. Meanwhile, since the wheel angular speed of the rotating tire changes, the vehicle speed changes. As a result, vibration in the vehicle front-back direction is generated in the unsprung portion of the Vehicle Ve. This front-back vibration is transmitted to the vehicle body, thereby deteriorating the riding quality.

As mentioned above, in the case where front-back vibration is generated, a force in the vehicle front-back direction (front-back force) is generated in the wheel (i.e., an unsprung portion of the vehicle). Accordingly, it can be said that the front-back force generated in the vehicle generates front-back vibration, thereby deteriorating the riding quality. Hereunder, the front-back force generated in the vehicle will be described.

Figure 3:
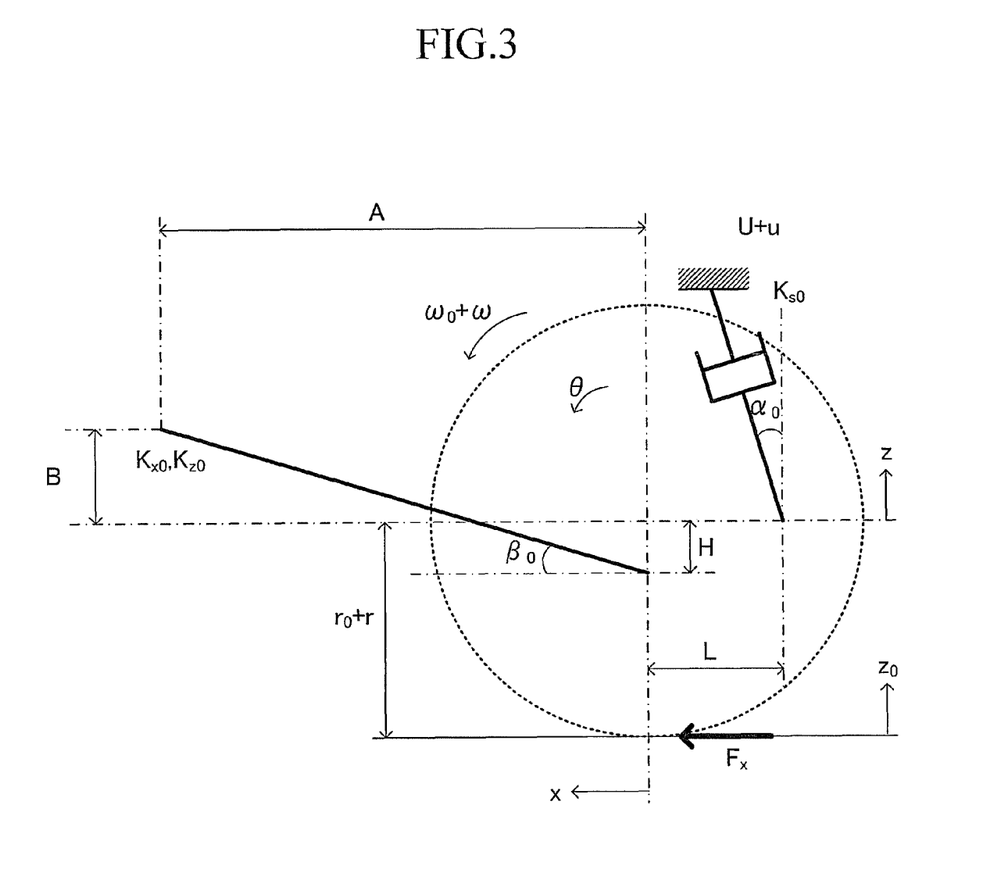
FIG. 3 is a diagram showing the suspension geometry of a suspension mechanism.

Generally, when an unsprung portion of the vehicle moves vertically, a front-back force is input from a tire to its suspension mechanism. In addition, the vertical movement of the unsprung portion of the vehicle causes the absorber constituting the suspension mechanism to generate a front-back force. Hereunder, there will be considered the suspension geometry of the suspension mechanism in the coordinate system defined by a z-axis representing the vehicle vertical direction and an x-axis representing the vehicle front-back direction as shown in FIG. 3.

For such a suspension mechanism, expressions 1 to 6 given below can be geometrically derived from the suspension geometry, and a front-back force Fx can be calculated from expression 7 given below. Notably, since expressions 1 to 7 can be geometrically derived from the suspension geometry shown in FIG. 3 through use of a well-known method, its detailed description will not be provided. In particular, expressions 1 to 3 given below are used to calculate stiffness of a principal elastic axis and damping performance of an absorber system (specifically, damping performance determined by an damping coefficient of a shock absorber and a spring constant of a spring). The stiffness of the principal elastic axis and the damping performance of the absorber system are used for control performed on the basis of an equivalent model which will be described later. By means of determining the specifications (refer to FIG. 3) described below, the values calculated from expressions 1 to 6 given below are statically determined as constants.

A and B represent constants which determine the position of the principal elastic axis; $\beta_0$ represents the inclination of the principal elastic axis; H represents the positional difference in the vehicle vertical direction (z-axial direction) between the center of gravity of the unsprung portion of the vehicle and the principal elastic axis; and $K_{x0}$, $K_{z0}$, and $K_{\theta 0}$ represent the magnitudes of stiffness of the principal elastic axis in the axial, bending, and rotational ($\theta$) directions respectively. Moreover, L represents the positional difference in the vehicle front-back direction (x-axial direction) between the center of gravity of the unsprung portion of the vehicle and the absorber; $\alpha_0$ represents the inclination of the absorber; and $K_{s0}$ represents the damping performance of the absorber system in the axial direction.

$$K'_x = \frac{K_{x0}(\cos\beta_0)^2 \left\{ \begin{array}{c} K_{s0}\left(\sin\alpha_0 + \frac{L\cos\alpha_0}{H}\right)^2 + \\ K_{z0}\left(\frac{A}{\cos\beta_0}\frac{1}{H}\right)^2 + \frac{K_{\theta 0}}{H^2} \end{array}\right\}}{+K_{x0}(\cos\beta_0)^2 + \left\{ \begin{array}{c} K_{s0}\left(\frac{L\cos\alpha_0}{H}\right)^2 + \\ K_{z0}\left(\frac{A}{\cos\beta_0}\frac{1}{H} - \sin\beta_0\right)^2 + \frac{K_{\theta 0}}{H^2} \end{array}\right\}} \quad (1)$$

$$K_x = \frac{K_{x0}(\cos\beta_0)^2 \cdot \left\{ \begin{array}{c} K_{z0}\left(\frac{A}{(\cos\beta_0)}\right)^2 + \\ K_{\theta 0}\left(1 - \frac{K_{z0}}{K_{x0}}\right)\frac{A\tan\beta_0}{A\tan\beta_0 - H} \end{array}\right\} / H^2}{+K_{x0}(\cos\beta_0)^2 + \left\{ \begin{array}{c} K_{s0}(L\cos\alpha_0)^2 + \\ K_{z0}\left(\frac{A}{\cos\beta_0} - H\sin\beta_0\right)^2 + \\ K_{\theta 0} \end{array}\right\} / H^2} \quad (2)$$

$$K_s = \frac{K_{s0}(\cos\alpha_0)^2 \{K_{z0}A'^2 + K_{x0}B'^2 + K_{\theta 0}\}/L^2}{K_{s0}(\cos\alpha_0)^2 + \{K_{z0}A'^2 + K_{x0}B'^2 + K_{\theta 0}\}/L^2} \quad (3)$$

$$\tan\alpha = \left[\left\{+\tan\alpha_0 - \frac{L\sin\beta_0}{A'}\right\}\left\{1 + \frac{L\cos\beta_0}{A'}\right\} + \frac{K_{\theta 0}}{K_{z0}A'^2}\tan\alpha_0 + \right. \quad (4)$$

$$\left. (\tan\alpha_0 \cdot H + L) \cdot H \cdot \left(1 + \frac{L}{H/\tan\beta_0}\right)\frac{K_{x0}(\cos\beta)^2}{K_{z0}A'^2}\right]$$

$$\frac{K_{z0}A'^2}{K_{z0}A'^2 + K_{x0}B'^2 + K_{\theta 0}}$$

$$\beta = \frac{(A\tan\beta_0 - H)}{A} \quad (5)$$

$$A' = A\cos\beta_0 + B\sin\beta_0 \quad (6)$$
$$B' = A\sin\beta_0 - B\cos\beta_0$$

$$Fx \cong \frac{1}{1 + \frac{P}{U}\frac{r_0^2}{I_T}\frac{1}{s} + \frac{Ps}{UK_{TX}}}\left(-\frac{W}{U}\dot{z}_0 + P\frac{\omega_0 \eta r}{U} - \frac{P}{U}\dot{x}\right) \quad (7)$$

Notably, in the expression 7 given above, U represents the vehicle speed, and P represents the driving stiffness (e.g., the friction coefficient of the tire). In the first term on the right-hand side of the expression 7, $I_T$ represents the inertial moment of the tire, $r_0$ represents the static loaded radius, $K_{TX}$ represents the spring constant of the tire in the vehicle front-back direction (x-axial direction), and s represents a Laplace operator. In the second term on the right-hand side of the expression 7, W represents the vertical load of the wheel, $\omega_0$ represents the wheel angular speed (more specifically, the angular speed of the tire), r represents the dynamic loaded radius, and $\eta$ represents the amount of change in the dynamic loaded radius of the tire (the amount of change in r/the amount of change in $r_0$). In the second term on the right-hand side of the expression 7, $z_0$ represents the displacement (e.g., 1/f input) of the road surface in the vehicle vertical direction (z-axial direction), and x represents the displacement in the vehicle front-back direction (x-axial direction). In the second term on the right-hand side of the expression 7, these displacements are first-order differentiated respectively.

Accordingly, by means of effectively suppressing the front-back force Fx calculated in accordance with the expression 7, the front-back vibration generated in the wheels can be suppressed to thereby improve the riding quality. In particular, in the vehicle Ve including the in-wheel motors 19 to 22 inside or near the corresponding wheels (unsprung portions), i.e., the left and right front wheels 11 and 12 and the left and right rear wheels 13 and 14, the front-back force Fx is large because the rotatory inertial moment of the wheels 11 to 14 is large. As a result, large front-back vibration is liable to be generated. The riding quality tends to deteriorate due to the generated front-back vibration. As seen from the above, the riding quality of the vehicle Ve can be improved by effectively suppressing the front-back force Fx.

Figure 4:
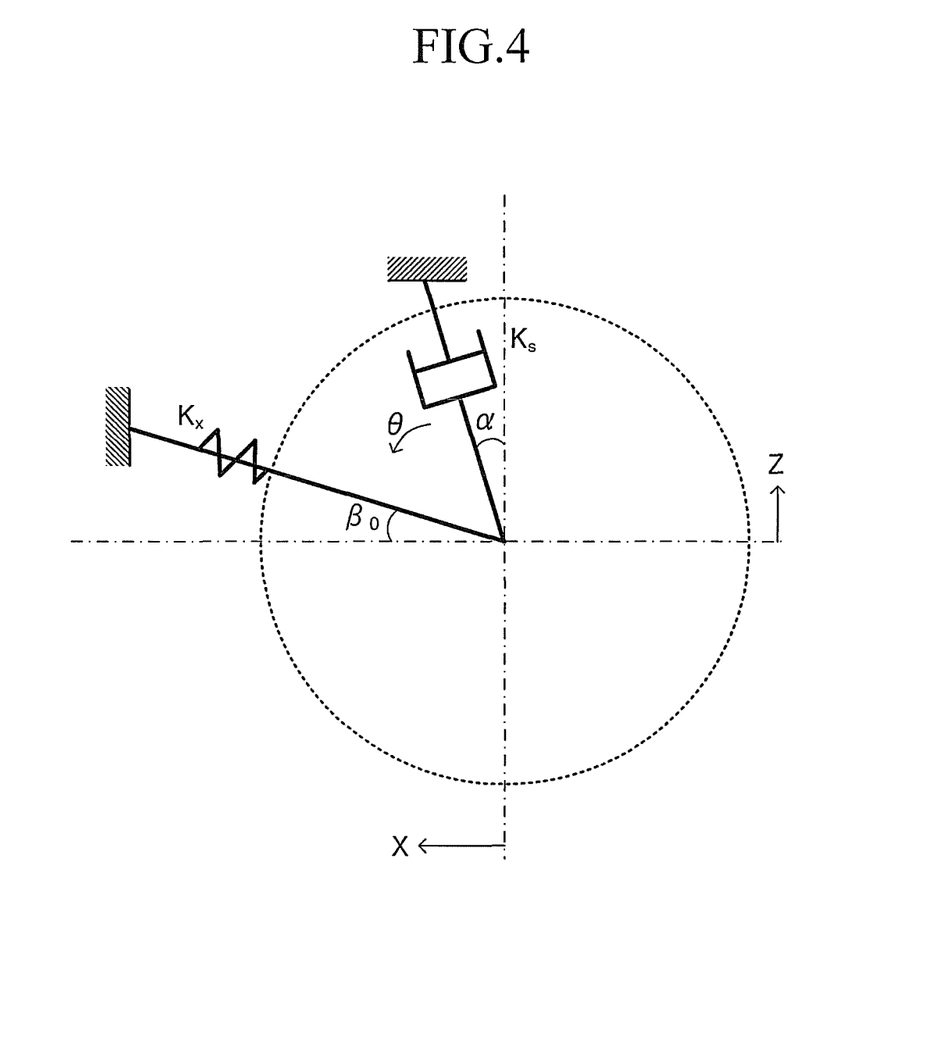
FIG. 4 is a diagram showing an equivalent model common to the first and third embodiments of the present invention.

Incidentally, instead of calculating in accordance with the expression 7 based on the suspension geometry as mentioned previously, the front-back force Fx may be calculated by use of an equivalent model shown in FIG. 4 which is equivalent to the model shown in FIG. 3. In the case where the equivalent model shown in FIG. 4 is used, in general, the following motion equations 8 and 9 hold.

$$mzs^2 = K_T(z_0 - z) - K_s z \quad (8)$$

$$Fx = \frac{1}{1 + \frac{P}{U}\frac{r_0^2}{I_T}\frac{1}{s} + \frac{PS}{UK_{TX}}}\left\{-\frac{Wz_0 s}{U} + \frac{P\omega_0 \eta(z - z_0)}{U}\right\} - \alpha K_s z - \beta K_x z \quad (9)$$

Notably, in the expression 8 given above, m represents the mass of the unsprung portion, $K_T$ represents the spring constant of the tire in the vehicle vertical direction (z-axial direction). In addition, in the expressions 8 and 9 given above, z represents the displacement of the unsprung portion (more specifically, its center of gravity) of the vehicle in the vehicle vertical direction (z-axial direction). In expressions 8 and 9, $K_s$ represents the damping performance of the absorber system calculated in accordance with the expression 3. In the expression 9, $K_x$ represents the stiffness of the principal elastic axis calculated in accordance with the expression 2, and $\alpha$ and $\beta$ correspond to $\alpha_0$ and $\beta_0$ in the model shown in FIG. 3.

The electronic control unit 30 controls output torques of the in-wheel motors 19 to 22 on the basis of the front-back force Fx calculated through use of the above-described equivalent model while taking into account generation of this front-back force Fx. Hereunder, the control of the output torques of the in-wheel motors 19 to 22 by the electronic control unit 30 will be described in detail with reference to the computation block diagram shown in FIG. 5.

Figure 5:
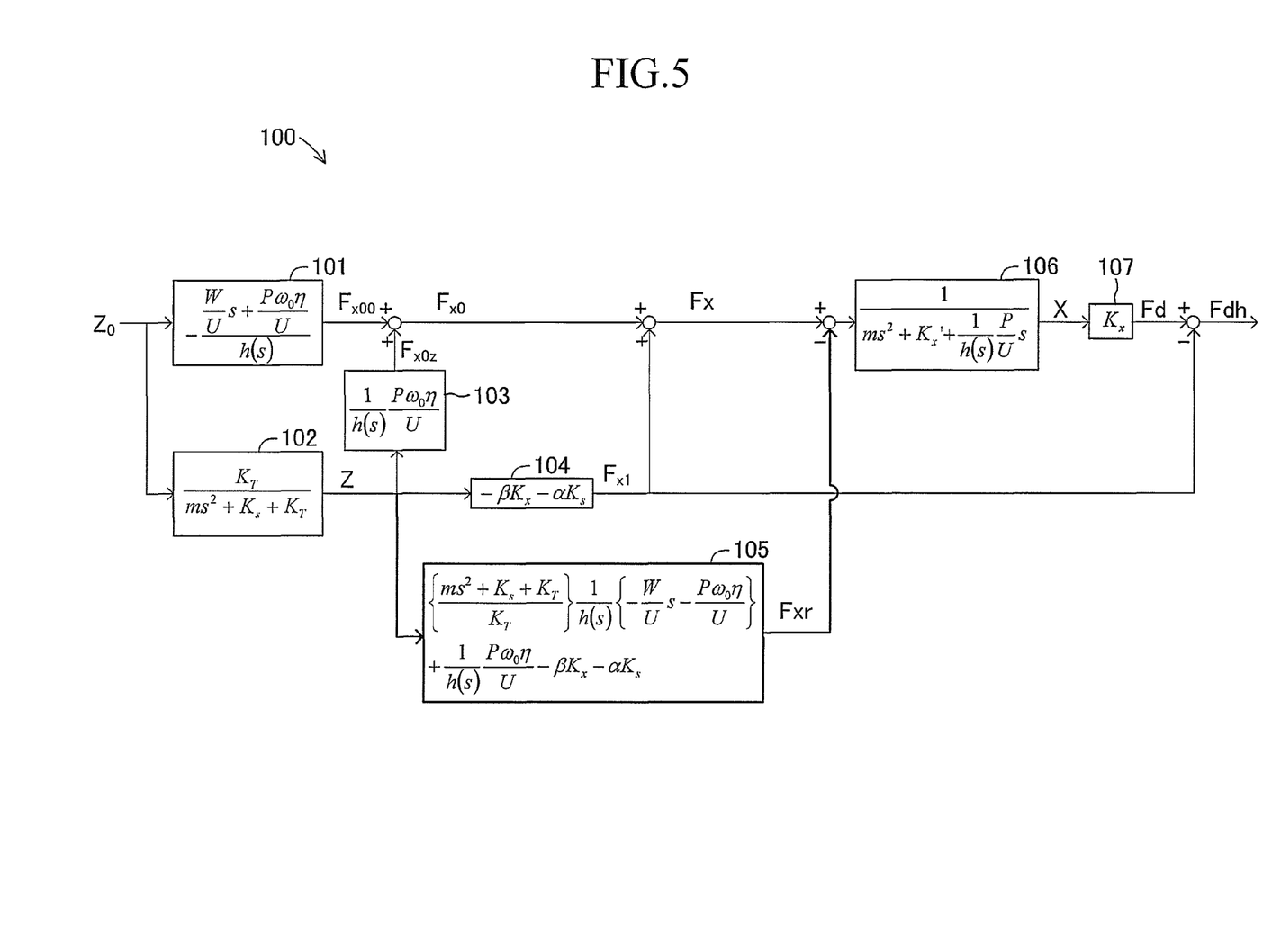
FIG. 5 is a schematic calculation block diagram relating to the first embodiment of the present invention.

In order to control the output torques of the in-wheel motors 19 to 22 in accordance with the procedure represented by the computation block diagram 100, the electronic control unit 30 first receives a vertical acceleration component $Z_0$ corresponding to the displacement of the road surface in the vehicle vertical direction (z-axial direction) (hereinafter simply referred to as a road surface vertical acceleration $Z_0$). Preferably, the road surface vertical acceleration $Z_0$ is estimated on the basis of the detection values of various sensors (e.g., a vertical acceleration sensor) installed in the vehicle Ve. In addition, needless to say, the received road surface vertical acceleration $Z_0$ can be differentiated or integrated as necessary.

Subsequently, in a computation process 101, the electronic control unit 30 calculates, in accordance with the expression 10 given below, a force (translational force) $F_{x00}$ in the vehicle front-back direction which acts on the unillustrated tires constituting the left and right front wheels 11 and 12 and the left and right rear wheels 13 and 14.

$$F_{x00} = -\frac{\frac{W}{U}s + \frac{P\omega_0\eta}{U}}{h(s)}Z_0 \quad (10)$$

Notably, in the expression 10 given above, U represents the speed of the vehicle Ve detected by the vehicle speed sensor 33, and $Z_0$ represents the road surface vertical acceleration received as mentioned above, and $1/h(s)$ is represented by the following expression 11.

$$\frac{1}{h(s)} = \frac{1}{1 + \frac{P}{U}\frac{r_0^2}{I_T}\frac{1}{s} + \frac{Ps}{UK_{TX}}} \quad (11)$$

In addition, in a computation process 102, the electronic control unit 30 calculates (detects), in accordance with the expression 12 given below, a vertical acceleration component Z corresponding to the displacement of each of the left and right front wheels 11 and 12 and the left and right rear wheels 13 and 14 in the vehicle vertical direction (z-axial direction) at the center of gravity of the unsprung portion of the vehicle (hereinafter simply referred to as an unsprung vertical acceleration Z). Accordingly, the computation process 102 constitutes the unsprung vertical acceleration detection means of the prevent invention. Notably, needless to say, the detected unsprung vertical acceleration Z can be differentiated or integrated as necessary.

$$Z = \frac{K_T}{ms^2 + K_s + K_T}Z_0 \quad (12)$$

After calculating (or detecting) the unsprung vertical acceleration Z, in a computation process 103, the electronic control unit 30 calculates, in accordance with the expression 13 given below, a force (translational force) $F_{x0z}$ in the vehicle front-back direction which acts on each of the left and right front wheels 11 and 12 and the left and right rear wheels 13 and 14 at the center of gravity of the unsprung portion of the vehicle.

$$F_{x0z} = \frac{1}{h(s)}\frac{P\omega_0\eta}{U}Z \quad (13)$$

Notably, in the expression 13 given above, U represents the vehicle speed of the vehicle Ve detected by the vehicle speed sensor 33, Z represents the unsprung vertical acceleration detected in the above-described computation process 102, and $1/h(s)$ is represented by the expression 11 given above.

After calculating, in accordance with the expression 10, the force (translational force) $F_{x00}$ in the vehicle front-back direction which acts on each tire (in the computation process 101) and calculating, in accordance with the expression 13, the vehicle front-back direction force (translational force) $F_{x0z}$ in the vehicle front-back direction which acts on each of the left and right front wheels 11 and 12 and the left and right rear wheels 13 and 14 at the center of gravity of the unsprung portion of the vehicle (in the computation process 103), the electronic control unit 30 adds together these forces $F_{x00}$ and $F_{x0z}$. Subsequently, the electronic control unit 30 calculates a force $F_{x0}$ in the front-back direction which is generated in each of the left and right front wheels 11 and 12 and the left and right rear wheels 13 and 14.

After detecting the unsprung vertical acceleration Z through the calculation (in the computation process 102), the electronic control unit 30 calculates, in accordance with the expression 14 given below, a force $F_{x1}$ in the vehicle front-back direction which is produced due to the phases of the rotating left and right front wheels 11 and 12 and the left and right rear wheels 13 and 14 (in a computation process 104).

$$F_{x1} = (-\beta K_x - \alpha K_s)Z \quad (14)$$

Subsequently, the electronic control unit 30 adds together the force $F_{x0}$ in the front-back direction which is generated in each of the wheels 11 to 14 (this force was calculated as mentioned above) and the force $F_{x1}$ in the vehicle front-back direction which is produced due to the phases of the rotating wheels 11 to 14 (this force was calculated in the computation process 104) in order to calculate the front-back force Fx (represented by the expression 9 given above) which is generated in each of the left and right front wheels 11 and 12 and the left and right rear wheels 13 and 14. Thus, the electronic control unit 30 estimates the front-back vibration generated in the unsprung portion of the vehicle Ve by calculating the front-back force Fx by use of the unsprung vertical acceleration Z detected through the calculation performed in the above-described computation process 102. Accordingly, the above-described computation processes 101, 103, and 104 constitute the front-back vibration estimation means of the present invention.

Meanwhile, after detecting the unsprung vertical acceleration Z through the calculation performed in a above-described computation process 102, in the computation process 105 indicated by a thick solid line in FIG. 5, the electronic control unit 30 calculates a front-back vibration suppressing force Fxr which is necessary for absorbing the front-back vibration through reduction of the front-back force Fx acting at the center of gravity of the unsprung portion of the vehicle. That is, the electronic control unit 30 calculates the front-back vibration suppressing force Fxr in accordance with the expression 15 given below which utilizes the unsprung vertical acceleration Z detected through the calculation performed in the above-described computation process 102. Accordingly, the above-described computation process 105 constitutes the front-back vibration suppressing force computation means of the present invention.

$$Fxr = \left[\left\{\frac{ms^2 + K_s + K_T}{K_T}\right\}\frac{1}{h(s)}\left\{-\frac{W}{U}s - \frac{P\omega_0\eta}{U}\right\} + \frac{1}{h(s)}\frac{P\omega_0\eta}{U} - \beta K_x - \alpha K_s\right]Z \quad (15)$$

As is obvious from the expression 15 given above, the front-back vibration suppressing force Fxr is calculated by multiplying the detected unsprung vertical acceleration Z by a gain, and corresponds to the force which is included in the front-back force Fx calculated as mentioned previously and which relates to the unsprung vertical acceleration Z.

After calculating the front-back vibration suppressing force Fxr as mentioned above, the electronic control unit 30 subtracts the front-back vibration suppressing force Fxr from the front-back force Fx calculated as mentioned above, and then proceeds to a computation process 106. In the computation process 106, the electronic control unit 30 calculates, in accordance with the expression 16 given below, a front-back displacement X in the vehicle front-back direction (x-axial direction) of each of the left and right front wheels 11 and 12 and the left and right rear wheels 13 and 14 which is caused as a result of action of the force calculated by subtracting the front-back vibration suppressing force Fxr from the front-back force Fx calculated as mentioned above (or the acceleration component in the vehicle front-back direction (x-axial direction) which corresponds to the displacement in the vehicle front-back direction (x-axial direction).

$$X = \frac{1}{ms^2 + K'_x + \frac{1}{h(s)}\frac{P}{U}s}(Fx - Fxr) \tag{16}$$

Notably, $K_x'$ included in the expression 16 given above is calculated in accordance with the expression 1 given above.

Subsequently, the electronic control unit 30 calculates a target output torque Fd of each of the in-wheel motors 19 to 22 by use of the expression 17 given below which multiplies together the front-back displacement X in the vehicle front-back direction (x-axial direction) of each of the left and right front wheels 11 and 12 and the left and right rear wheels 13 and 14 (calculated in the above-described computation process 106) and the stiffness $K_x$ of the principal elastic axis.

$$Fd=K_xX \tag{17}$$

Next, the electronic control, unit 30 performs phase correction for the target output torque Fd of each of the in-wheel motors 19 to 22 calculated in accordance with the expression 17 given above to thereby obtain a corrected target output torque Fdh. Specifically, in accordance with the expression 18 given below, the electronic control unit 30 subtracts, from the target output torque Fd, the force $F_{x1}$ in the vehicle front-back direction which is produced due to the phases of the rotating left and right front wheels 11 and 12 and the left and right rear wheels 13 and 14 (calculated in accordance with the expression 14 given above).

$$Fdh=Fd-F_{x1} \tag{18}$$

After calculating the corrected target output torque Fdh as mentioned above, the electronic control unit 30 supplies AC power corresponding to the calculated corrected target output torque Fdh to each of the in-wheel motors 19 to 22 via the inverter 23. As a result, each of the in-wheel motors 19 to 22 applies the electromagnetic driving or braking forces corresponding to the calculated corrected target output torques Fdh to each of the corresponding left and right front wheels 11 and 12 and the left and right rear wheels 13 and 14. Accordingly, the inverter 23 constitutes the braking-driving force generation mechanism operating means of the present invention.

As mentioned above, the electronic control unit 30 can effectively suppress the front-back vibration by operating the in-wheel motors 19 to 22 via the inverter 23 on the basis of the corrected target output torque Fdh in order to control the electromagnetic driving or braking force. Hereunder, this will be described in detail with reference to FIG. 6.

Figure 6:
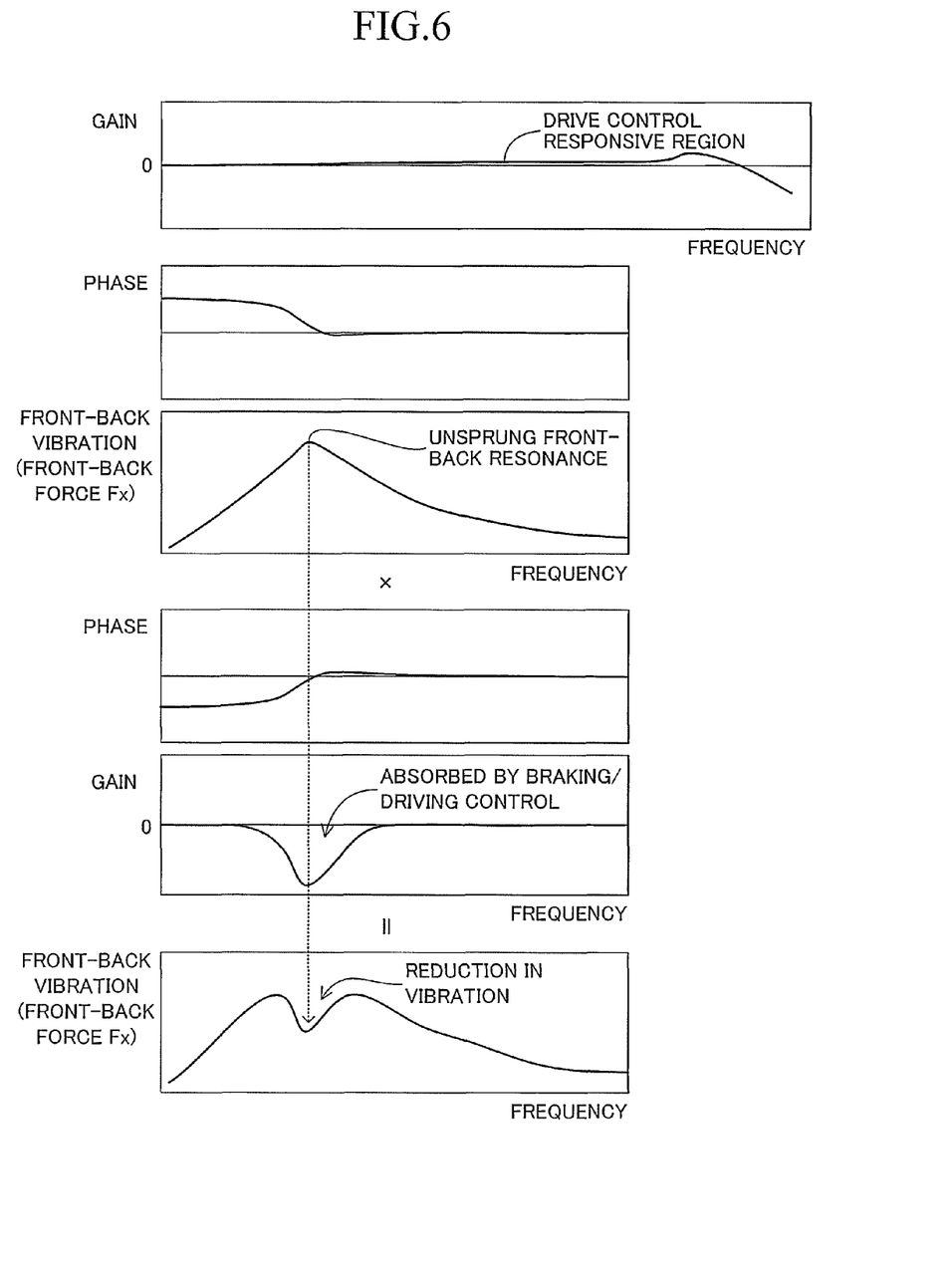
FIG. 6 is a diagram showing that front-back vibration can be reduced through reduction of front-back force.

FIG. 6 shows front-back vibrations within a region in which the in-wheel motors 19 to 22 can respond to drive control. As mentioned above, in the case where the front-back vibration suppressing force Fxr is not subtracted from the front-back force Fx, the generated front-back force Fx causes an unsprung front-back resonance to occur, which deteriorates the riding quality of the vehicle Ve. In contrast, in the case where the front-back vibration suppressing force Fxr is subtracted from the front-back force Fx, the front-back vibration is effectively absorbed at the frequency at which the unsprung front-back resonance occurs. In other words, by means of multiplying the front-back force Fx at or near the resonance frequency (at which the unsprung front-back resonance occurs) by a gain corresponding to the front-back vibration suppressing force Fxr, the unsprung front-back resonance can be suppressed, thereby effectively suppressing the uncomfortable front-back vibration felt by the driver.

As can be understood from the above description, according to the above-described first embodiment, the electronic control unit 30 can estimate the front-back vibration of the unsprung portion of the vehicle Ve by calculating the front-back force Fx. In addition, the electronic control unit 30 can calculate the front-back vibration suppressing force Fxr which acts to absorb the front-back vibration (or to reduce the front-back force Fx). Furthermore, the electronic control unit 30 can finally calculate the corrected target output torque Fdh by use of the calculated front-back vibration suppressing force Fxr, thereby operating the in-wheel motors 19 to 22 appropriately. Therefore, even for the vehicle Ve having in-wheel motors 19 to 22 which increase the rotational moments of inertia of the wheels 11 to 14, the braking-driving force control device of the vehicle according to the above-described first embodiment can effectively suppress the front-back vibration occurring in the unsprung portions (including the wheels 11 to 14) of the vehicle, thereby improving the riding quality of the vehicle Ve.

b. Second Embodiment

In the above-described first embodiment, the electronic control unit 30 detects the unsprung vertical acceleration Z, and calculates the target output torque Fd through reduction of the front-back vibration suppressing force Fxr which is included in the front-back force Fx generated in each of the left and right front wheels 11 and 12 and the left and right rear wheels 13 and 14 and which corresponds to the force related to the unsprung vertical acceleration Z. Meanwhile, as mentioned above, when the dynamic loaded radius r changes due to deformation of the tire of each of the wheels 11 to 14 which occurs in accordance with the shape of the road surface, the wheel angular speed $\omega_0$ of each of the wheels 11 to 14 changes. In this case, as is obvious from the expression 9 given above (the expression 7 given above), since the front-back force Fx generated in each of the wheels 11 to 14 is calculated taking into account the inertial moment $I_T$ of the tire of each of the wheels 11 to 14, the front-back force Fx generated in each of the wheels 11 to 14 increases or decreases with the change in the wheel angular speed $\omega_0$ of each of the wheels 11 to 14. As a result, front-back vibration may be generated.

To solve this problem, in the second embodiment, the electronic control unit 30 detects the amount of change ω in the wheel angular speed $\omega_0$ of each of the wheels 11 to 14, and reduces the front-back force Fx generated in accordance with this amount of change ω. Hereunder, the second embodiment will be described in detail. The components which are the same as those of the above-described first embodiment are identified by the same symbols as those used to identify the corresponding components of the first embodiment, and specific descriptions of those components are omitted accordingly.

In the second embodiment, as indicated by the broken line in FIG. 1, wheel angular speed sensors 34$i$ (i=fl, fr, rl, rr) are provided as wheel rotational speed detection means for detecting the wheel speeds in the rotational direction of the wheels 11 to 14, i.e., the wheel angular speeds. The electronic control unit 30 receives the signals representing the wheel angular speeds of the wheels 11 to 14 from the wheel angular speed sensors 34$i$ (i=fl, fr, rl, rr).

Figure 7:
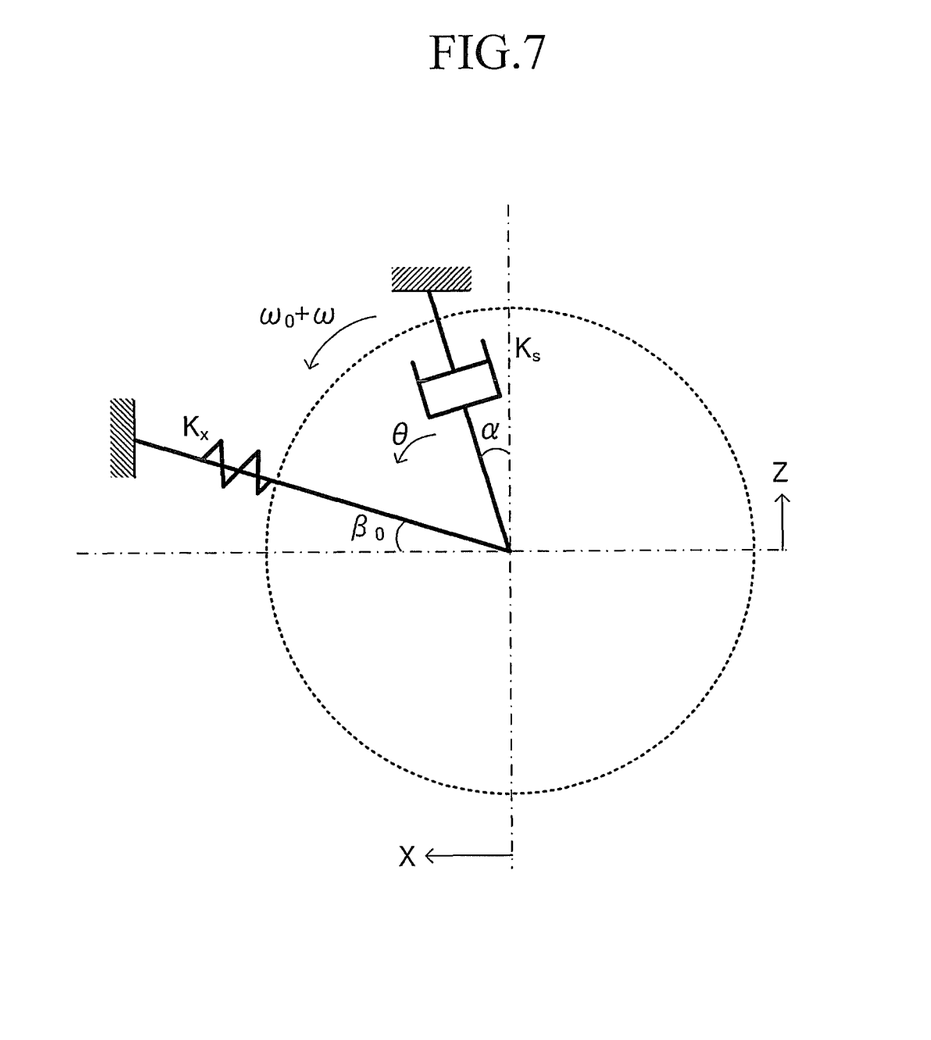
FIG. 7 is a diagram showing an equivalent model according to the second embodiment of the present invention.

In addition, in the second embodiment, as indicated by the equivalent model shown in FIG. 7, the electronic control unit 30 detects the amount of change ω in the wheel angular speed $ω_0$ of each of the wheels 11 to 14 which occurs as a result of the change in the dynamic loaded radius r, and controls the output torque of each of the in-wheel motors 19 to 22 taking into account the front-back force Fx generated in accordance with the amount of change ω. Hereunder, the control of the output torques of the in-wheel motors 19 to 22 by the electronic control unit 30 will be described in detail with reference to the computation block diagram shown in FIG. 8.

Figure 8:
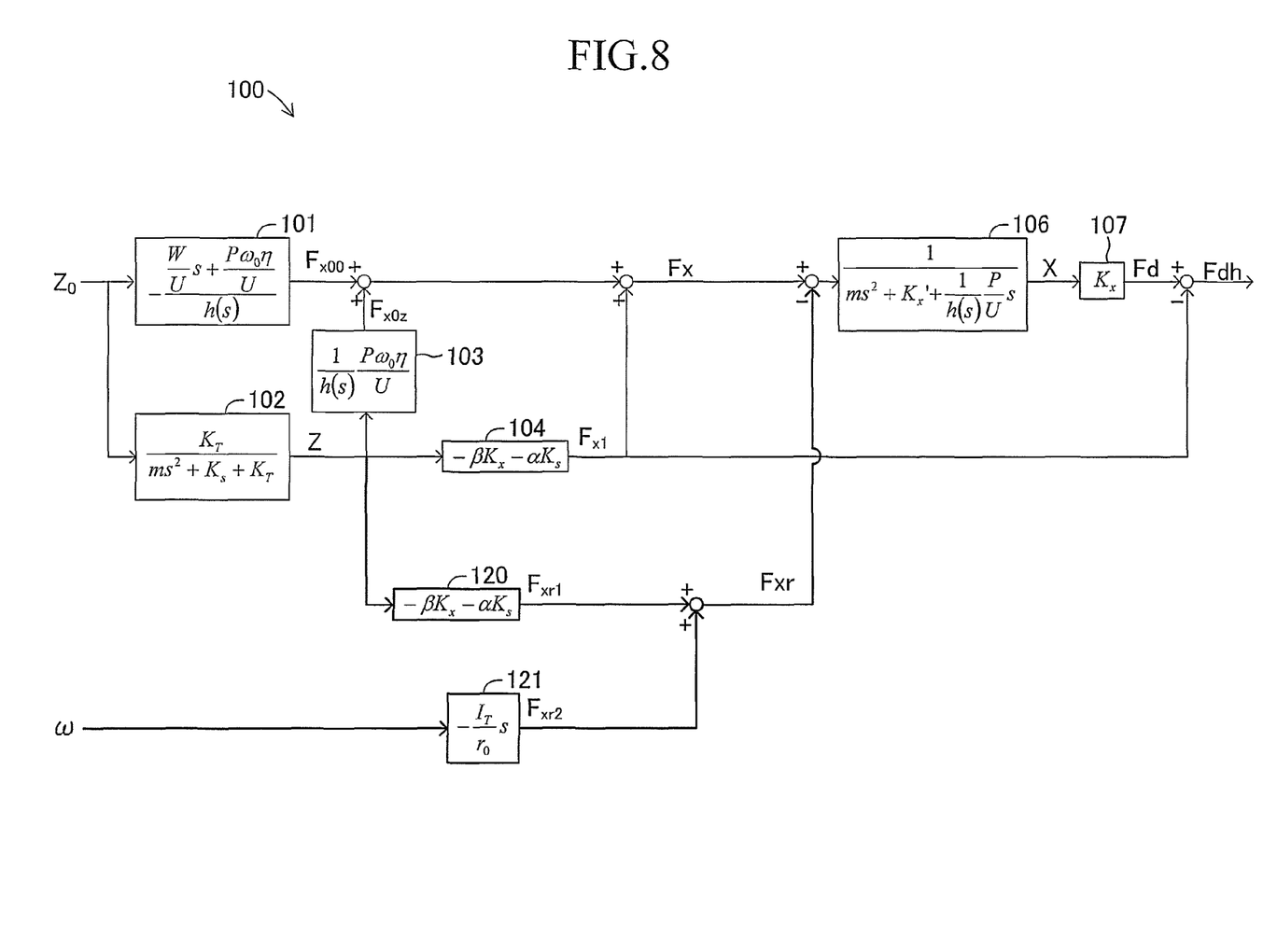
FIG. 8 is a schematic calculation block diagram relating to the second embodiment of the present invention.

The computation block diagram 100 of the second embodiment differs from that of the first embodiment in that the computation process 105 indicated by a thick solid line in FIG. 5 is substituted by the computation processes 120 and 121 indicated by thick solid lines in FIG. 8. Accordingly, in the second embodiment as well, the electronic control unit 30 executes the computation processes 101 to 104 and the computation processes 106 and 107 just like in the above-described first embodiment. Hence, hereunder, the computation processes 120 and 121 will be described in detail.

The electronic control unit 30 calculates the unsprung vertical acceleration Z in accordance with the expression 12 given above in the above-described computation process 102, and then executes the computation process 120. In the computation process 120, the electronic control unit 30 calculates a suppressing force $F_{xr1}$ in accordance with the following expression 19 similar to the expression 14 given above in order to reduce the force $F_{x1}$ in the vehicle front-back direction which is calculated in the above-described computation process 104 and which is produced due to the phases of the left and right front wheels 11 and 12 and the left and right rear wheels 13 and 14, which are rotating.

$$F_{xr1} = (-βK_x - αK_s)Z \quad (19)$$

In addition, the electronic control unit 30 receives from each of the wheel angular speed sensors 34$i$ (i=fl, fr, rl, or rr) the wheel angular speed $ω_0$ of each of the wheels 11 to 14 (more specifically, the amount of change ω in the wheel angular speed $ω_0$ at the time when the tire deforms in accordance with the shape of the road surface). Next, in the computation process 121, in accordance with the following expression 20 utilizing the received amount of change ω, the electronic control unit 30 calculates a suppressing force $F_{xr2}$ for reducing the force in the vehicle front-back direction which is produced due to the amount of change ω in the wheel angular speed.

$$F_{xr2} = -\frac{I_T}{r_0} sω \quad (20)$$

After calculating the suppressing forces $F_{xr1}$ and $F_{xr2}$ in the above-described computation processes 120 and 121, the electronic control unit 30 adds together these suppressing forces $F_{xr1}$ and $F_{xr2}$ in order to calculate the front-back vibration suppressing force Fxr. Accordingly, the computation processes 120 and 121 constitute the front-back vibration suppressing force computation means of the present invention. Next, just like in the above-described first embodiment, by means of executing above-described computation processes 106 and 107, the electronic control unit 30 calculates (and determines) the target output torque Fd (more specifically, the corrected target output torque Fdh), to thereby operate the in-wheel motors 19 to 22.

Accordingly, in the second embodiment, the generated front-back vibration can be effectively absorbed just like in the above-described first embodiment, thereby improving the riding quality of the vehicle Ve.

c. Third Embodiment

In the above-described first and second embodiments, the electronic control unit 30 subtracts the front-back vibration suppressing force Fxr from the front-back force Fx generated in each of the wheels 11 to 14 in order to calculate the target output torque Fd (more specifically, the corrected target output torque Fdh), to thereby operate the in-wheel motors 19 to 22 under so-called feedforward control. The above-described first and second embodiments may be modified such that the electronic control unit 30 calculates the target output torque Fd (more specifically, the corrected target output torque Fdh) by using the front-back vibration suppressing force Fxr as a feedback input, and operates the in-wheel motors 19 to 22 under so-called feedback control. Hereunder, such a modification will be described in detail as a third embodiment. The components which are the same as those of the above-described first and second embodiments are identified by the same symbols as those used to identify the corresponding components of the first and second embodiments, and specific descriptions of those components are omitted accordingly.

Figure 9:
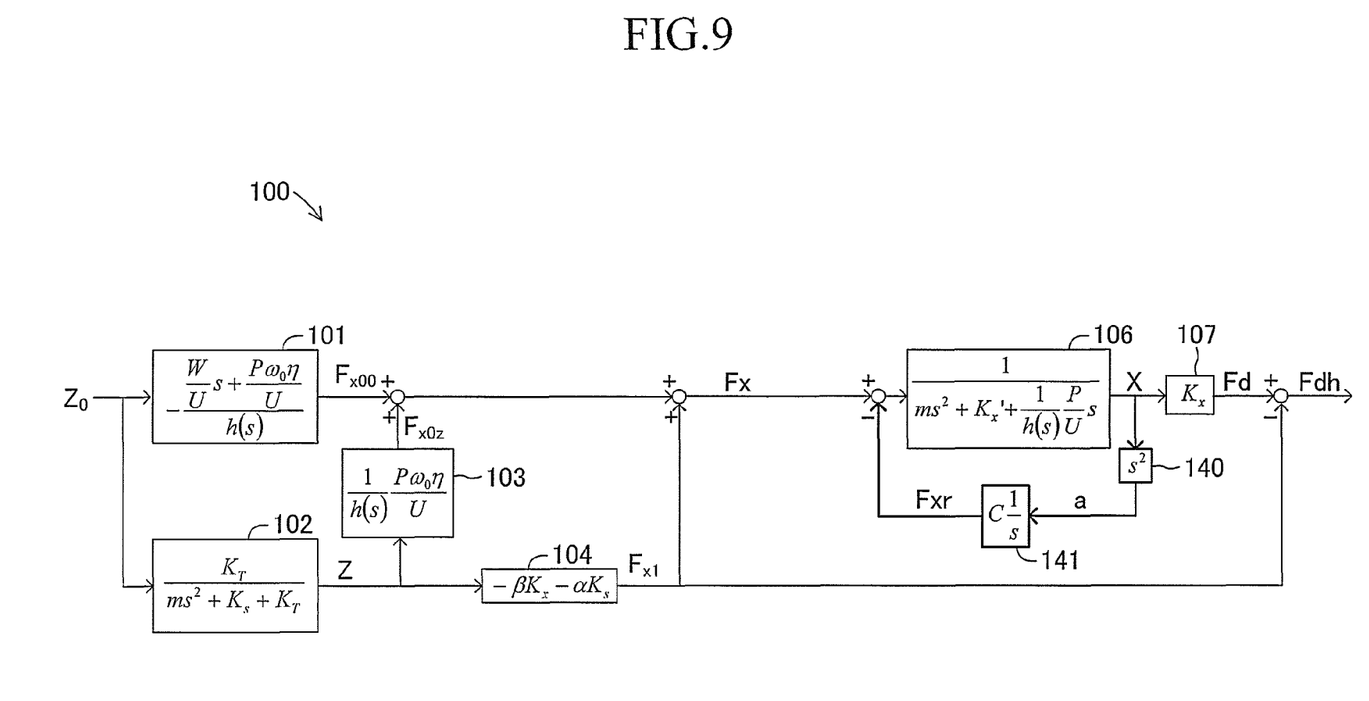
FIG. 9 is a schematic calculation block diagram relating to the third embodiment of the present invention.

As shown in FIG. 9, the computation block diagram 100 of to the third embodiment differs from the computation block diagrams of the first and second embodiments in that the computation process 105 indicated by a thick solid line in FIG. 5 and the computation processes 120 and 121 indicated by thick solid lines in FIG. 8 are omitted and there are provided computation processes 140 and 141 to which the front-back displacement X calculated in the computation process 106 is fed back. Accordingly, in the third embodiment as well, just like in the above-described first embodiment, the electronic control unit 30 executes the computation processes 101 to 104 and the computation processes 106 and 107. Hence, hereunder, the computation processes 140 and 141 will be described in detail.

In the third embodiment, just like in the above-described first and second embodiments, the electronic control unit 30 executes the above-described computation process 101 to 104 so as to calculate the front-back force Fx, and then executes the above-described computation process 106 so as to calculate the front-back displacement X in accordance with the expression 16 given above. In addition, in the third embodiment, the electronic control unit 30 executes the above-described computation process 107 so as to calculate the target output torque Fd in accordance with the expression 17 given above which utilizes the calculated front-back displacement X, and then executes the computation process 140 so as to second-order differentiate the calculated front-back displacement X, to thereby calculate (detect) the acceleration a of the unsprung portion in the vehicle front-back direction (x-axial direction) (hereinafter simply referred to as an unsprung front-back acceleration a). Accordingly, the above-described computation process 140 constitutes the unsprung front-back acceleration detection means of the present invention.

Subsequently, in the computation process 141, the electronic control unit 30 calculates the front-back vibration suppressing force Fxr in accordance with the expression 21 given below which utilizes the unsprung front-back acceleration a calculated (detected) in the above-described computation process 140. Accordingly, the above-described computation process 141 constitutes the front-back vibration suppressing force computation means of the present invention.

$$Fxr = C\frac{a}{s} \quad (21)$$

Notably, in the expression 21 given above, C represents the damping coefficient of the shock absorber constituting each of the suspension mechanisms 15 to 18. Accordingly, the front-back vibration suppressing force Fxr calculated in accordance with the expression 21 given above is a damping force with which the shock absorber of each of the suspension mechanisms 15 to 22 reduces the front-back force Fx in accordance with the speed of front-back displacement in the vehicle front-back direction (x-axial direction) of the unsprung portion of the vehicle Ve (i.e., each of the left and right front wheels 11 and 12 and the left and right rear wheels 13 and 14) which is caused by the front-back force Fx.

As mentioned above, the electronic control unit 30 uses the front-back displacement X calculated in the above-described computation process 106 (more specifically, the unsprung front-back acceleration a calculated in the above-described computation process 140) as a feedback input, and calculates the front-back vibration suppressing force Fxr in the above-described computation process 141. Next, in the above-described computation process 106, the electronic control unit 30 calculates the front-back displacement X again by subtracting the front-back vibration suppressing force Fxr from the calculated front-back force Fx. That is, in the above-described computation process 106, the electronic control unit 30 calculates the front-back displacement X by use of the front-back force Fx which is reduced by the front-back vibration suppressing force Fxr, and in the above-described computation process 107, calculates the target output torque Fd by use of the calculated front-back displacement X. Finally, the electronic control unit 30 calculates the corrected target output torque Fdh in accordance with the above-described expression 18, and controls the driving or braking force to be applied by each of the in-wheel motors 19 to 22 by use of the calculated corrected target output torque Fdh.

As mentioned above, in the third embodiment as well, since the front-back force Fx can be reduced appropriately, the front-back vibration can be effectively suppressed, thereby improving the riding quality of the vehicle Ve.

In the above-described third embodiment, the electronic control unit 30 calculates, in the above-described computation process 140, the unsprung front-back acceleration a by second-order differentiating the front-back displacement X (feedback input). However, for example, in the case where an unsprung front-back acceleration sensor for directly detecting the unsprung front-back acceleration a is provided for each of the wheels 11 to 14, the third embodiment may be modified such that the electronic control unit 30 inputs the unsprung front-back acceleration a detected by this unsprung front-back acceleration sensor in the above-described computation process 141.

In this case as well, the unsprung front-back acceleration a detected by the unsprung front-back acceleration sensor is produced due to the front-back force Fx which acts on each of the wheels 11 to 14. Therefore, by means of calculating the front-back vibration suppressing force Fxr in the computation process 141 and subtracting it from the calculated front-back force Fx, the electronic control unit 30 can reduce the front-back force Fx appropriately, while using the unsprung front-back acceleration a as a feedback input. Accordingly, even in the case where the unsprung front-back acceleration sensor is used, just like in the above-described third embodiment, the front-back vibration can be effectively suppressed, thereby improving the riding quality of the vehicle Ve.

The present invention is not limited to the above-described first to third embodiments, and various modifications are possible without departing from the scope of the present invention.

For example, in the above-described third embodiment, the electronic control unit 30 calculates the front-back vibration suppressing force Fxr by using the front-back displacement X as a feedback input, and reduces the front-back force Fx by use of the calculated front-back vibration suppressing force Fxr. In this case, the feedback control according to the above-described third embodiment may be performed in addition to the feedback control according to the above-described first or second embodiment. In this case, the electronic control unit 30 can calculate the target output torque Fd (more specifically, the corrected target output torque Fdh) more appropriately and finely in order to control operations of the in-wheel motors 19 to 22. Accordingly, in this case as well, the front-back vibration can be suppressed effectively, thereby improving the riding quality of the vehicle Ve.

In the above-described embodiments, the electronic control unit 30 detects the unsprung vertical acceleration Z through calculation in the above-described computation process 102. However, for example, in the case where the unsprung vertical acceleration sensor is provided in each of the wheels 11 to 14 in order to directly detect the unsprung vertical acceleration Z, needless to say, the embodiments may be modified such that the electronic control unit 30 performs calculations in the above-described computation processes 103, 104, 105, and 120 by use of the unsprung vertical acceleration Z detected by the unsprung vertical acceleration sensor. Even in the case where the unsprung vertical acceleration Z detected by the unsprung vertical acceleration sensor is used as mentioned above, effects similar to those of the above-described embodiments are expected.

In the above-described embodiments, it is assumed that the driving stiffness P relating to the friction coefficient of the tire (i.e., the road surface condition), the spring constant $K_T$ of the tire in the vehicle vertical direction which relates to the load of the vehicle Ve, the amount of change η in the dynamic loaded radius of the tire, etc. are constant. However, needless to say, the embodiments may be modified such that P, $K_T$, η, etc. are handled as variables which vary in accordance with the traveling state of the vehicle Ve (more specifically, the road surface condition, the load condition, the tire pressure, etc.). In this case, the electronic control unit 30 can calculate the target output torque Fd (more specifically, the corrected target output torque Fdh) more specifically and finely in order to control operations of the in-wheel motors 19 to 22. Accordingly, in this case as well, the front-back vibration can be suppressed effectively, thereby improving the riding quality of the vehicle Ve.

In addition, in the above-described third embodiment, the above-mentioned computation process 141 is performed on the assumption that the damping coefficient C of the shock absorber constituting each of the suspension mechanisms 15 to 18 is a constant. However, for example, in the case where each of the suspension mechanisms 15 to 18 is configured using a shock absorber whose damping force (damping coefficient) can be changed, the third embodiment may be modified such that the electronic control unit 30 changes the damping force (i.e., damping coefficient C) of the shock absorber. In this case, since the magnitude of the front-back vibration suppressing force Fxr calculated in the above-described computation process 141 can be changed appropriately, the front-back force Fx can be reduced effectively. Accordingly, in this case as well, the front-back vibration can be suppressed effectively, thereby improving the riding quality of the vehicle Ve.

The invention claimed is:

1. A braking-driving force control device of a vehicle comprising a braking-driving force generation mechanism for individually generating an electromagnetic driving or braking force at each wheel of the vehicle and control means for controlling the braking-driving force generation mechanism in order to individually generate the electromagnetic driving or braking force at the wheel, the braking-driving force control device being characterized in that the control means comprises:

unsprung vertical acceleration detection means for detecting vertical acceleration of an unsprung portion of the vehicle in a vehicle vertical direction, the unsprung portion including the wheel;

front-back vibration estimation means for estimating a front-back vibration generated in the unsprung portion of the vehicle in a vehicle front-back direction, on the basis of a vehicle speed and of the vertical acceleration detected by the unsprung vertical acceleration detection means;

unsprung front-back acceleration detection means for detecting front-back acceleration of the unsprung portion of the vehicle in the vehicle front-back direction;

front-back vibration suppressing force computation means for computing a front-back vibration suppressing force for absorbing the front-back vibration, estimated by the front-back vibration estimation means, by use of the front-back acceleration detected by the unsprung front-back acceleration detection means; and braking-driving force generation mechanism operating means for operating the braking-driving force generation mechanism on the basis of the front-back vibration suppressing force computed by the front-back vibration suppressing force computation means.

2. A braking-driving force control device of a vehicle according to claim 1, wherein the front-back vibration suppressing force computation means computes the front-back vibration suppressing force by use of the vertical acceleration detected by the unsprung vertical acceleration detection means.

3. A braking-driving force control device of a vehicle according to claim 2, wherein the control means includes wheel rotational speed detection means for detecting speed of the wheel in a rotational direction thereof, and the front-back vibration suppressing force computation means computes the front-back vibration suppressing force by use of the speed of the wheel in the rotational direction which is detected by the wheel rotational speed detection means.

4. A braking-driving force control device of a vehicle according to claim 1, wherein the front-back vibration estimation means computes a front-back force in the vehicle front-back direction which is generated in the unsprung portion of the vehicle by use of the vertical acceleration detected by the unsprung vertical acceleration detection means, and estimates the front-back vibration on the basis of the calculated front-back force.

5. A braking-driving force control device of a vehicle according to claim 4, wherein the braking-driving force generation mechanism operating means operates the braking-driving force generation mechanism by use of a value obtained by subtracting the front-back vibration suppressing force computed by the front-back vibration suppressing force computation means from the front-back force computed by the front-back vibration estimation means.

6. A braking-driving force control device of a vehicle according to claim 1, wherein the front-back vibration suppressing force computation means receives, through feedback, the detected front-back acceleration from the unsprung front-back acceleration detection means, and computes the front-back vibration suppressing force by use of the received front-back acceleration.

* * * * *